(No Model.)
S. D. WRIGHT & J. W. HORNSEY.
ROLLER BEARING WHEEL.
No. 515,101. Patented Feb. 20, 1894.
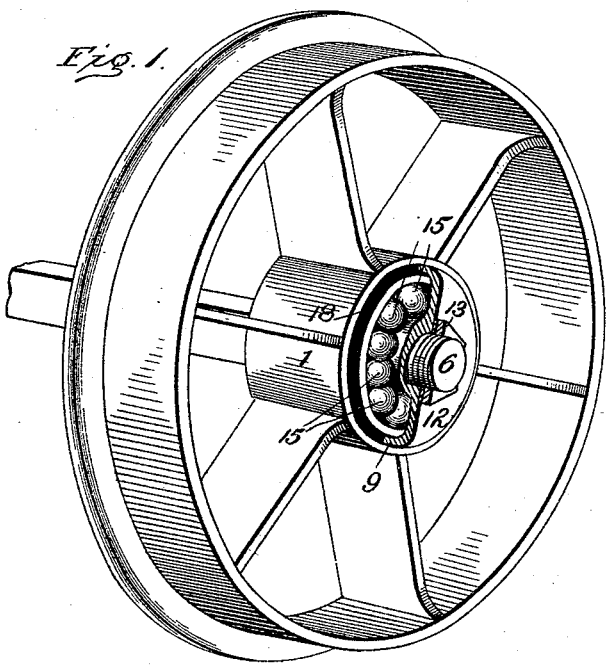
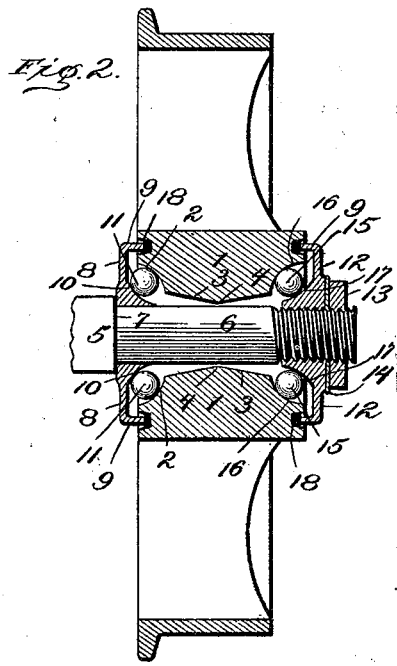
WITNESSES
INVENTORS

UNITED STATES PATENT OFFICE.

SAMSON D. WRIGHT AND JOHN W. HORNSEY, OF CLEVELAND, OHIO, ASSIGNORS TO THE BALL BEARING CAR WHEEL MANUFACTURING COMPANY, OF SAME PLACE.

ROLLER-BEARING WHEEL.

SPECIFICATION forming part of Letters Patent No. 515,101, dated February 20, 1894.

Application filed June 7, 1893. Serial No. 476,845. (No model.)

*To all whom it may concern:*

Be it known that we, SAMSON D. WRIGHT and JOHN W. HORNSEY, citizens of the United States, and residents of the city of Cleveland, in the county of Cuyahoga and State of Ohio, have invented certain new and useful Improvements in Roller-Bearing Wheels, of which the following is a specification.

For coal, freight and mining cars the waste of oil for lubricating the journals of the wheels is immense. This is not only very expensive but is objectionable in the greasy condition of the running gear and the tracks produced thereby and in the gumming of the oil in cold weather.

Our improvements are directed to provision whereby in the use of ball bearings to effect the entire saving of car oil and the time of an oiler; to prevent the wear of the journal; to lessen the power required to start and to pull the car and thereby lessen the expense of the outfit in the number of mules and drivers; to render the wheel as durable as that of a self oiling wheel and give it a perfectly balanced and true position upon the balls. For such cars these are highly important advantages, and so far as we know and can find there is not in use in the coal and mining trades in this country, cars having wheels which obtain these advantages or any of them.

Figure 1 shows such a wheel in perspective with a portion of the fixed axle collar removed to expose its relation and construction to the wheel hub, its groove, and to the row of bearing balls; and Fig. 2 is a central cross section of the wheel showing it as mounted upon the axle arm and its engagement with the rims of the fixed and of the adjustable collars.

The wheel has its hub adapted for use with ball bearings and has no contact bearing upon the axle-arm or journal. Its hub 1 is chilled and this chilling is done in the operation of casting the wheel, but it is an important feature, the provision of which conduces to the accomplishment of all the advantages claimed for our wheel, in its connection with co-acting elements which go to make our wheel and axle the most satisfactory yet used in the cars of the coal and mining trades, as its use has abundantly shown. This chilling of the wheel hub is made to give greater strength and hardness to the hub of the wheel, and to provide hard and smooth confining seats for the balls upon which the wheel is mounted. These seats are formed by grooves 2 and 16 concave in their cross section around each end of the hub standing outwardly and upwardly at the junction of the inner wall of the central opening and the ends of the hub. These grooves must be perfectly smooth and true, and the chilling gives the perfect finish to their surfaces, and exact symmetrical position of these grooves at each end of the hub. To do this we found it necessary after much experimenting, to use a chill-core of two separable counterparts and to so form them that while making the central opening of the wheel-hub, their outer walls must taper so as to produce the conical walls 3 seen in Fig. 2, meeting at a line 4 preferably central with the width of the hub. This allows the placing and withdrawal of the separable chill-cores to chill the hub and to form at the same time the finished ball-retaining hardened seats, so that the wheel when cast, will be complete with chilled hub and chilled and finished ball races at each end joining the conical walls of its central opening. It is evident that without such separable counter-part chill-cores, the wheel could not be produced with a chilled-hub, for the reason that the contact of the hot metal upon the chill-cores will cause them to expand, while the hub in cooling contracts, and were it not therefore, for the conical form of the inner walls of the hub as seen, it would be impossible to withdraw the chill-cores from the hub. As this chill casting part of our invention, however, is made the subject of a separate and distinct application for a patent by us, it is deemed unnecessary to more particularly describe it herein.

The axle 5 is formed with the bearing arm or journal 6 which is screw threaded at its end, and has a shoulder 7 at the junction of the arm with the axle. Upon this shoulder a collar 8 is forced, that is to say, it is compressed by special machinery so as to insure solidity and trueness as a fixed part of the axle. The diameter of this collar is a little less than that of the wheel-hub and its circumference terminates in an inward standing rim 9, the purpose of which we will presently state. The inner wall of this fixed collar at its junction with the axle arm is formed with an annular seat 10 which is concave in its cross section and stands inward and downward and forms a seating and raceway for the balls, co-incident the annular concave seat 2 symmetrical with that formed in each end of the hub and within and between which a row of balls 16 is confined so as to have a free rolling action upon the walls of said grooves. The collar is made of hardened wrought iron or steel that all the wear surfaces will be equally hard. A collar 12 of identical construction with the fixed collar is screwed upon the threaded end of the axle arm and held in place by a jam nut 13 and an interposed washer 14. Between this collar and the outer end of the hub a row of balls 15 is confined between and within co-incident hub and collar seats, 16 and 17, and upon these two end rows of balls, the wheel is seated, balanced and supported free of the axle arm, and revolves freely upon said balls. We compress the inner collar upon the axle so that it will serve as a fixed abutment against which the perfect alignment of the wheel is both made and maintained by the adjustable collar and nut. For, were this collar 8 free for rotation upon the axle-arm it would produce wear both upon the arm and upon the shoulder and cause an unsteady and untrue and wabbling support of the wheel at that side and thereby not only destroy its alignment in relation to the axle, but the perfect balance of the wheels upon the balls and thereby produce irregular wear at every point. Indeed, but for this provision of the fixed seating abutment for the inner row of balls, the object and purpose of our invention would be practically destroyed. It is with this fixed ball seating abutment that the adjusting function of the outer ball seating collar, is made usefully operative to take up the wear of the parts and to maintain the true and easy and smooth working of the wheel. Each end of the hub outside of and concentric with the ball seating grooves is formed with a groove 18 deep enough to receive both packing and the rims 9, respectively of the collars, whereby said rims are caused to stand within and be embedded in the packing and form a water and dust tight joint for the protection of the bearings.

By having the rims of the collars extend into the grooves in both ends of the hub of the wheel, the rims serve to shed the water from the joints over the outer sides of the collars. Because as the rims extend into the grooves they cross the face line of the hub and instead of forming a gutter to catch and hold water and dust they turn it off. The fixed collar 8 and its rim 9 also serves as the means of supporting and centering the wheel in placing it upon the axle. In this operation the axle is supported vertically and the balls put into the collar recess and rest against the rim, the wheel is then put upon the axle in a horizontal position and rests upon the balls and rim of the collar and it is in this position that the collar and rim forms an annular abutment and centering device supporting the wheel in its true set at right angles to the axle. The second set of balls is then placed within the groove in the upper end of the wheel-hub and the outer collar screwed upon the axle. The driving action of this outer collar forces the bearing balls into their seats while the rim of this screw collar, bearing within the hub groove completes the perfect alignment of the wheel upon its axle. In this operation it is important that the grooves should be concentrically co-incident with each other so that the pressure of the rim shall be at opposite points upon the hub. The placing of the packing containing grooves in the ends of the hub, we found to give the advantage of allowing the collars to be made of a diameter to bring their rims close to the edges of the hub seats, and thereby cause the hub edges to strike the outer side of the balls and put them in their seats in fitting the parts together. This advantage could not be obtained if the grooves were placed in the collars, because such latter construction would entail the necessity of having to lower and support the wheel on the axle away from the fixed collar, to place the balls upon and within the hub-seat and then reverse the position of the wheel and axle to put the other collar and balls in place. Owing to the great weight of the wheel and axle this operation requires much labor, time and expense, which we save by placing the grooves in the hub ends as shown.

We claim as our improvement—

1. In a roller bearing wheel, in combination, the wheel-hub formed with annular concave chilled seats at each end and with concentric grooves in each end, the axle-arm having the shoulder 7 and the screw-threaded end, the collar 8 fixed upon said arm and shoulder and having the annular concave seat, and the rim 9 fitting into one of said hub-grooves, the screw-collar 12 having the annular concave seat and the annular rim 9 fitting into the groove at the other end of said hub, and the balls, substantially as described.

2. In a roller bearing wheel, in combination, the wheel-hub formed with the concentric grooves in its end walls, the axle-arm having the screw-threaded end, the fixed collar 8, and the screw collar 12, both said collars having circumferential rims fitting into said hub-grooves, and the bearing-balls confined within suitable concave seats formed in the hub and by the said collars, whereby water shedding closures are formed for the bearing balls and seats, between rotary and nonrotary parts, as described.

In testimony whereof we have hereunto signed this specification in the presence of witnesses.

SAMSON D. WRIGHT.
JOHN W. HORNSEY.

Witnesses:
M. MILLARD,
E. F. WRIGHT.